(12) United States Patent
Busser et al.

(10) Patent No.: US 8,990,888 B2
(45) Date of Patent: Mar. 24, 2015

(54) METHOD AND APPARATUS FOR PROVIDING A ONE-TIME PASSWORD

(75) Inventors: Jens-Uwe Busser, München (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 13/813,971

(22) PCT Filed: Jul. 22, 2011

(86) PCT No.: PCT/EP2011/062641
§ 371 (c)(1), (2), (4) Date: Feb. 4, 2013

(87) PCT Pub. No.: WO2012/016858
PCT Pub. Date: Feb. 9, 2012

(65) Prior Publication Data
US 2013/0145449 A1    Jun. 6, 2013

(30) Foreign Application Priority Data
Aug. 3, 2010 (DE) .......................... 10 2010 033 232

(51) Int. Cl.
*H04L 9/32* (2006.01)
*H04L 9/00* (2006.01)
(Continued)

(52) U.S. Cl.
CPC .......... *H04L 63/0838* (2013.01); *H04L 9/3228* (2013.01); *H04L 9/0866* (2013.01); *G06F 21/31* (2013.01); *G06F 2221/2117* (2013.01); *G06F 2221/2129* (2013.01)
USPC ....................... 726/2; 726/3; 380/44; 713/168

(58) Field of Classification Search
CPC ..... H04L 9/0861; H04L 9/0863; H04L 63/08; H04L 63/083; H04L 63/0838; H04L 63/0846; H04L 63/0869; H04L 63/0876; H04L 9/3228; G06F 21/44; G06F 21/445
USPC .............. 726/2–7, 27–30; 713/168–170, 178, 713/181–184; 380/44, 46
See application file for complete search history.

(56) References Cited

U.S. PATENT DOCUMENTS

| 5,825,300 A | 10/1998 | Bathrick et al. ............. 340/5.74 |
| 6,292,896 B1 | 9/2001 | Guski et al. ................... 713/169 |

(Continued)

FOREIGN PATENT DOCUMENTS

| CN | 101651675 A1 | 2/2010 | .............. H04L 29/06 |
| DE | 102005009867 A1 | 9/2006 | ................ H04L 9/30 |

(Continued)

OTHER PUBLICATIONS

Krawcszyk, H., "HMAC: Keyed-Hashing for Message Authentication," Memo, Network Working Group, 11 pages, Feb. 1997.
(Continued)

*Primary Examiner* — Hosuk Song
(74) *Attorney, Agent, or Firm* — King & Spalding L.L.P.

(57) ABSTRACT

In a method for providing a one-time password for a user device belonging to a user, which password is intended to register the user device with a server, the server generates the one-time password using a cryptographic operation on the basis of a unique use identifier and transmits the password to the user device. The method provides a service provider with the possibility of tying additional conditions for registration to the one-time password and thus increases the flexibility of the service provider when configuring the services offered by the latter and increases security against manipulation.

20 Claims, 1 Drawing Sheet

(51) Int. Cl.
  *H04L 9/08* (2006.01)
  *G06F 21/31* (2013.01)
  *H04L 29/06* (2006.01)

(56) References Cited

U.S. PATENT DOCUMENTS

| | | | | |
|---|---|---|---|---|
| 6,530,025 | B1* | 3/2003 | Nakagawa et al. | 726/4 |
| 6,601,175 | B1 | 7/2003 | Arnold et al. | 726/7 |
| 7,243,228 | B2* | 7/2007 | Shirai et al. | 713/160 |
| 7,409,705 | B2* | 8/2008 | Ueda et al. | 726/5 |
| 7,418,727 | B2* | 8/2008 | Lin et al. | 726/5 |
| 7,444,508 | B2 | 10/2008 | Karjala et al. | 713/156 |
| 8,166,531 | B2* | 4/2012 | Suzuki | 726/9 |
| 8,301,877 | B2 | 10/2012 | Grajek et al. | 713/156 |
| 2002/0095507 | A1 | 7/2002 | Jerdonek | 709/229 |
| 2004/0158708 | A1 | 8/2004 | Peyravian et al. | 713/156 |
| 2007/0079135 | A1 | 4/2007 | Saito | 713/183 |
| 2008/0276098 | A1 | 11/2008 | Florencio et al. | 713/183 |
| 2011/0022845 | A1 | 1/2011 | Pietre-cambacedes et al. | 713/175 |
| 2013/0132721 | A1 | 5/2013 | Busser et al. | 713/168 |
| 2013/0145449 | A1 | 6/2013 | Busser et al. | 726/7 |

FOREIGN PATENT DOCUMENTS

| | | | | |
|---|---|---|---|---|
| FR | 2929471 | A1 | 10/2009 | H04L 12/16 |
| WO | 2012/016858 | A1 | 2/2012 | G06F 21/00 |
| WO | 2012/016859 | A1 | 2/2012 | H04L 9/08 |

OTHER PUBLICATIONS

Kaliski, B., "PKSC #10: Certification Request Syntax Version 1.5," Memo, Network Working Group, RSA Laboraties East, 9 pages, Mar. 1998.

Nystrom, M. et al., "PKCS #9: Selected Object Classes and Attribute Types Version 2.0," Memo, Network Working Group, RSA Security, 43 pages, Nov. 2000.

Nystrom, M. et al., "PKCS #10: Certification Request Syntax Specification Version 1.7," Memo, Network Working Group, RSA Security, 15 pages, Nov. 2000.

IEEE Standard for a Precision Clock Synchronization Protocol for Networked Measurement and Control Systems, IEEE Instrumentation and Measurement Society, IEEE Std 1588-2088, Jul. 24, 2008.

German Office Action, Application No. 10 2010 033 232, 2 pages, Jan. 26, 2011.

German Office Action, Application No. 10 2010 033 231, 5 pages, Apr. 11, 2011.

International Search Report and Written Opinion, Application No. PCT/EP2011/062641, 6 pages, Sep. 6, 2011.

International Search Report and Written Opinion, Application No. PCT/EP2011/062645, 20 pages, Nov. 25, 2011.

Chinese Office Action, Application No. 201180037981, 12 pages.

Chinese Office Action, Application No. 201180037990, 11 pages.

* cited by examiner

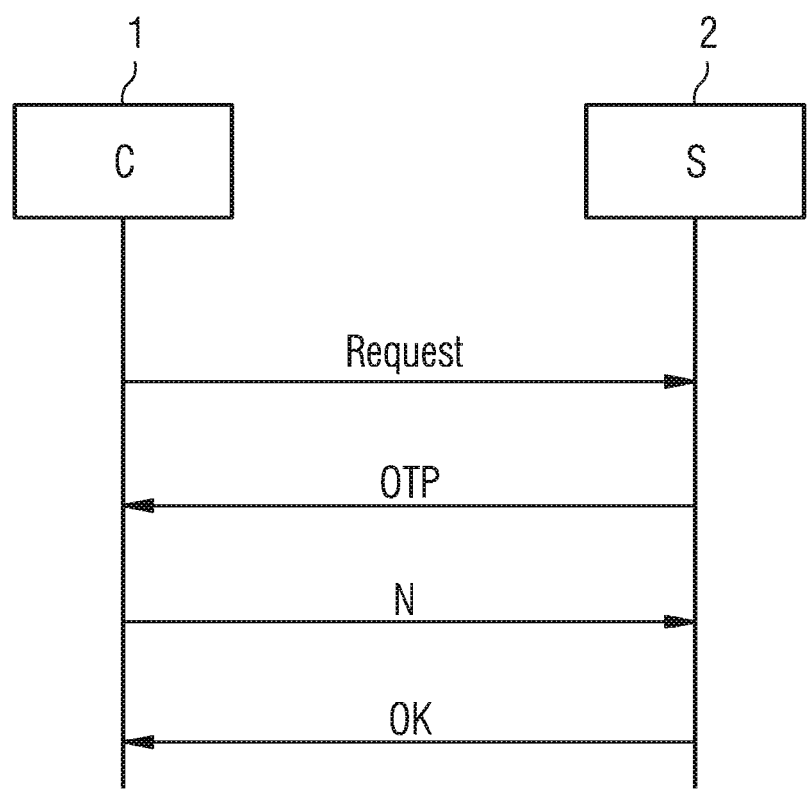

METHOD AND APPARATUS FOR PROVIDING A ONE-TIME PASSWORD

CROSS-REFERENCE TO RELATED APPLICATIONS

This application is a U.S. National Stage Application of International Application No. PCT/EP2011/062641 filed Jul. 22, 2011, which designates the United States of America, and claims priority to DE Patent Application No. 10 2010 033 232.1 filed Aug. 3, 2010 The contents of which are hereby incorporated by reference in their entirety.

TECHNICAL FIELD

The disclosure relates to a method and an apparatus for providing a one-time password for a user device for the purpose of registering the latter with a server.

BACKGROUND

In many application scenarios, user devices are connected to a server via a non-secure data network. In order that the user devices or client devices can exchange data in a protected format with the server, the user devices are therefore equipped with corresponding security credentials. These security credentials, which can be e.g. passwords or other security tokens, are in many cases generated by a central component, e.g. a server of a service provider, and then distributed to the user devices or to administrators of such user devices or services. In many cases, use is made of so-called one-time passwords (OTP). By virtue of such a one-time password OTP, the user device or the client can register with a server once for a corresponding service directly. For future registrations, the client either has to set a new password or receives a security token, e.g. a digital certificate or a so-called cookie, from the server. It is also possible to use further one-time passwords that are sent beforehand in a list, e.g. TANs or hash strings. Random character strings are normally used as one-time passwords. After generation of a one-time password, the one-time password OTP is stored in a database. If a user device or a client registers with the server, the one-time password (OTP) is flagged as used or is deleted from the database. A second registration of the user device with the server using this one-time password is then no longer possible. Alternatively, it is possible to generate a sufficient quantity of one-time passwords in accordance with a specific established method and to store only those one-time passwords that have already been used in the database. If hash strings are used, provision is then made for storing only the most recently used one-time password OTP in the database, for example. The one-time password OTP is normally stored on the server side, in order that a comparison can be made during the registration of the user device with the server.

Further examples of conventional one-time passwords OTP are so-called transaction numbers TAN and mobile transaction numbers TANs, which are used in the context of online banking, for example.

In the case of conventional one-time passwords OTP, it is however not possible to limit the use of a one-time password OTP or to tie it to a specific condition. This may nonetheless be desirable in many cases, e.g. if a user is expected to register with the server from a specific device, or if the registration of the user device with the server is only allowed to take place at a specific time.

SUMMARY

In one embodiment, a method is provided for providing a one-time password for a user device of a user, said password being intended to register the user device with a server, wherein the server generates the one-time password using a cryptographic operation on the basis of a unique use identifier and transmits said password to the user device, wherein the user device stores the one-time password received from the server and transmits it with the use identifier during a registration of the user device with the server, wherein during the registration of the user device with the server, the server verifies the user device with reference to the use identifier that is implicitly contained in the one-time password that has been received.

In a further embodiment, the unique use identifier is formed by a user ID of the user or by a user device ID of the user device.

In a further embodiment, the server generates the one-time password by calculating a cryptographic function value of the unique use identifier.

In a further embodiment, the server calculates the cryptographic function value of the use identifier as a one-time password using a secret cryptographic key.

In a further embodiment, the server calculates the cryptographic function value as a one-time password by means of a predetermined cryptographic function, in particular a hash function, for the unique use identifier using the secret cryptographic key.

In a further embodiment, the server calculates the cryptographic function value as a one-time password on the additional basis of a time stamp or random number.

In a further embodiment, the server deletes the one-time password it has generated, after said password has been transmitted to the user device.

In a further embodiment, the generated one-time password is sent with the user device to the user for the purpose of registering the user device of the user with the server.

In a further embodiment, the generated one-time password is sent from the server via a data network or using a data medium to a user device that is sited on the premises of the user, for the purpose of registering said user device with the server.

In a further embodiment, a validity of the one-time password that has been generated by the server expires after a predetermined time duration.

In another embodiment, a server is provided for providing a one-time password for a user device of a user, said password being intended to register the user device with the server, wherein the server generates the one-time password using a cryptographic operation on the basis of a unique use identifier and transmits said password to the user device, wherein for the purpose of registering with a server, the user device sends both the one-time password received from the server and the use identifier to the server, which verifies the user device with reference to the use identifier that is implicitly contained in the one-time password and the use identifier that is received, and grants access to a service accordingly.

In a further embodiment, the unique use identifier is formed by a user ID of the user or by a user device ID of the user device.

BRIEF DESCRIPTION OF THE DRAWING

Aspects of the disclosed method and the system for providing a one-time password (OTP) are described below with reference to FIG. 1.

FIG. 1 shows a signal flow diagram illustrating a method and server for providing a one-time password, according to an example embodiment.

DETAILED DESCRIPTION

Embodiments of the present disclosure provide a method for providing a one-time password for a user device, which method offers the possibility of tying additional conditions to the one-time password.

Some embodiments provide a method for providing a one-time password (OTP) for a user device, which password is intended to register the user with a server, wherein the server generates the one-time password (OTP) using a cryptographic operation on the basis of a unique use identifier and transmits the password to the user device.

In one embodiment, the unique use identifier is formed by a user ID of the user.

In a further embodiment, the unique use identifier is formed by a user device ID of the user device.

In a further embodiment, the unique use identifier is formed by a combination of the user ID of the user and the user device ID of the user device.

In one embodiment, the server generates the one-time password by calculating a cryptographic function value of the unique use identifier.

In one embodiment, as a one-time password (OTP), the server calculates the cryptographic function value of the use identifier using a secret cryptographic key.

In one embodiment, the server calculates the cryptographic function value as a one-time password (OTP) by means of a predetermined cryptographic function, in particular a hash function, for the unique use identifier using the secret cryptographic key.

In one embodiment, the server calculates the cryptographic function value as a one-time password (OTP) on the additional basis of a time stamp.

In a further embodiment, the server calculates the cryptographic function value as a one-time password (OTP) on the additional basis of a random number.

In one embodiment, the user device stores the one-time password (OTP) that is received from the server, and transmits this one-time password (OTP) with the use identifier during a registration of the user device with the server.

In one embodiment, during the registration of the user device with the server, the server verifies the user device with reference to the use identifier that is implicitly contained in the one-time password (OTP).

In one embodiment, after the transmission of the generated one-time password (OTP) to the relevant user device, the server deletes the one-time password (OTP) it has generated.

In one embodiment, the generated one-time password (OTP) is sent with the user device to the user, in order that the user device of the user can register at the server.

In one embodiment, the generated one-time password (OTP) is sent from the server via a data network or using a data medium to a user device that is sited on the premises of the user, in order that said user device can register with the server.

In one embodiment, a validity of the one-time password (OTP) that has been generated by the server expires after a predetermined time duration.

Other embodiments provide a server for providing a one-time password (OTP) for a user device, which password is intended to register the user device with a server, wherein the server generates the one-time password (OTP) using a cryptographic operation on the basis of a unique use identifier and transmits said password to the user device.

In one embodiment, the unique use identifier is formed by a user ID of a user.

In an alternative embodiment, the unique use identifier is formed by a user device ID of the user device.

In one embodiment, during a registration of the user device with the server, the user device is verified with reference to the use identifier that is implicitly contained in the one-time password received from the server.

As shown in FIG. 1, a user device 1 and a server 2 communicate via a data network and exchange messages. The user device 1 can be any desired user device that is sited on the premises of a user, e.g. in a household. The user device 1 can be a mobile user device or a permanently installed user device. The data network can be a wireless or wire-based data network, or an association of different data networks, e.g. the Internet.

An example of a user device 1 is an energy gateway for an intelligent power supply network. Other examples include medical devices that are sited in the room of a patient for the purpose of exchanging patient data with a corresponding host server. Further possible examples include fire detectors or alarm detectors that supply an alarm report to a service provider, e.g. the fire service. In addition, the user device 1 can be a communications device, e.g. a pay-TV box, which allows a user to receive films from a server 2. The server 2 can be situated on the premises of a service provider, for example. The service provider can manufacture or outsource user devices 1 and supply these to possible customers. Alternatively, the user devices 1 can be acquired on the open market. The user devices 1 can be uniquely identified in each case via a serial number or similar means. Furthermore, each customer or user can have a unique customer number. If a customer who has received a user device 1 from a service provider or acquired a user device 1 on the open market wishes to register the user device 1 with the service provider, the user sends a request message or a request via the data network to the server 2 of the service provider as illustrated in FIG. 1. As a result of this, a one-time password OTP is generated in a cryptographic operation on the basis of a unique use identifier by a generator that is provided in the server 2. A use identifier can be a user ID of the user, for example, in particular a customer number. Alternatively, the use identifier can be a user device ID, e.g. a serial number of the user device 1. In addition, the use identifier can be a unique address, e.g. a MAC address. As illustrated in FIG. 1, the server 2 transmits the one-time password OTP that has been formed by the cryptographic operation, to the user device 1 that is to be registered, via the data network.

The generated one-time password OTP can be transmitted to the user device 1 via the data network as illustrated in FIG. 1, or also alternatively via another communication channel. It is also possible for the generated one-time password OTP to be transmitted from the server 2 to the user device 1 offline using a data medium. This data medium can take the form of a USB stick, for example. In a possible embodiment, the data medium and the user device 1 that is to be installed are sent together from a service provider to the user in a parcel via a postal service. The user then connects the enclosed data medium (e.g. a USB stick) to the user device 1 in order to read out the one-time password OTP, such that the user device 1 can register with the server 2, using the one-time password OTP that has been read out, in order to enable the service.

It is also possible for the data medium (e.g. the USB stick) that transports the generated one-time password OTP to be sent to the user separately from the user device 1 in a different parcel. In a further possible embodiment, the data medium is a data memory that can be integrated in the user device 1. This data memory can be access-protected, for example, and unlocked by means of a password in order that the user can gain access to the one-time password OTP stored therein. As soon as the user or the user device 1 receives (online or offline) the one-time password OTP that was formed by the server 2, the user device 1 can register with the server 2 for the relevant service by means of a registration message N. With regard to the one-time password OTP that is generated by the server 2 and received by the user device 1, the use identifier (e.g. a user account or a customer number or a corresponding device identifier such as e.g. a serial number) is implicitly contained or encoded in the one-time password OTP. This prevents another user or another device from using this one-time password OTP to register with a server 2. For example, if the server 2 uses a hash function to form the one-time password OTP for a user device 1 from the known device ID and a secret cryptographic key of the device ID, the one-time password OTP thus formed is unique: OTP=H($K_{priv}$, device ID). In this case, the device ID of the user device 1 is also sent to the server 2 as part of the message N during the registration i.e. during the transfer of the registration message N. Using the secret cryptographic key ($K_{priv}$) the server 2 can then efficiently check the accuracy of the one-time password OTP, without the need to store the one-time password OTP centrally in the server 2 for checking purposes. Using the disclosed method, it is therefore possible for the server 2 to delete or remove from its data memory the one-time passwords OTP it has generated, after these have been transmitted to the user devices 1. It is thereby possible significantly to reduce the administration expense on the side of the server 2 or the service provider. Moreover, this offers the particular advantage that verification of a received one-time password OTP can be performed successfully at the server 2 in the event of a data memory failure at the server 2, even if such one-time passwords OTP are lost.

In a further embodiment, a validity of a one-time password OTP that has been generated by the server 2 expires after a predetermined configurable time duration, e.g. after some minutes or hours. If the registration of the user device 1 is successful, the server 2 can notify the user device 1 accordingly by means of an OK message.

In one embodiment, when transmitting the registration message N from the user device 1 to the server 2, the one-time password OTP is not transmitted in plain text but is cryptographically protected. In a further possible embodiment, the transmission of the message N for registering the user device 1 with the server 2 takes place via a cryptographically protected connection, e.g. a TLS or SSL connection. The transmitted registration message N can be verified with reference to a checksum in this case.

In a further embodiment, the calculation of the cryptographic function value that forms the one-time password OTP is effected by means of a predetermined cryptographic function (e.g. a hash function) for the unique use identifier using the secret cryptographic key, making use of additional information or data. In this case, in a possible embodiment, the server 2 can calculate the cryptographic function value as a one-time password OTP on the additional basis of a time stamp. A time specification or time stamp, e.g. <MMYY> or <DDMMYY> or <days since 01.01.2010>, allows a further one-time password OTP to be generated per user account, specifying a month or day. In particular, this embodiment is suitable for the situation in which a one-time password OTP is only briefly valid and a new one-time password is only rarely required. It is also possible to use a so-called UTC time value here. In this case, a Unix time describes e.g. the number of seconds that have elapsed since 01.01.1970. It is therefore possible to generate very rapidly changing one-time passwords OTP for a specific use identifier, e.g.: OTP=Hash(K, ID, <DDMMYY>).

This embodiment can use a time specification for the purpose of generating or checking a one-time password OTP, wherein a synchronized time specification is required for this purpose. In a possible embodiment, time synchronization is effected by means of protocols such as e.g. NTP (Network Time Protocol) or IEEE 1588.

In a further embodiment, the server sends a cryptographic function value as a one-time password OTP on the additional basis of a random number. This random number can be generated by e.g. a random generator. For example, the one-time password OTP is calculated as follows:

$$OTP=Hash(K,<random\ number>,ID)\|<random\ number>$$

Assuming a random number of appropriate length, it is therefore possible to generate any amount of one-time passwords OTP.

Instead of a hash method in which a key K is concatenated directly with a message, a so-called keyed-hash method can be used in a specific variant. In a possible embodiment, the keyed-hash value is calculated as per standard RFC 2104:

$$HMAC(K,m)=H((K\ XOR\ opad)\|H((K\ XOR\ ipad)\|m))$$

where m is a message, e.g. a registration message,
where opad and ipad are predefined strings or character strings, and
where K is a one-time password OTP or a value that is dependent on the one-time password OTP, e.g. K=H(OTP).

In a further variant, a symmetrical encryption algorithm, e.g. AES (Advanced Encryption Standard), can be used in a CBCMAC mode (Cipher Block Chaining Message Authentication Code) instead of the hash method.

Certain embodiments of the disclosed method may offer a number of advantages. For example, a one-time password OTP can be generated in accordance with a permanently defined rule using a cryptographic operation, such that the one-time password OTP is linked to a specific use identifier, e.g. a user ID or a user account number. Moreover, the one-time password OTP that has been formed does not have to be stored in a data memory of the server 2 before it is used, and therefore the overall administration of this data is simplified considerably.

In one embodiment, the one-time password OTP can be linked to a customer name of a user, e.g. a customer of a power supply company. Moreover, the disclosed method allows further one-time passwords OTP to be generated for the same user or the same customer name if required. Once formed, the one-time password OTP is cryptographically just as secure as a pure random number. The generator or the server 2 of the one-time password OTP does not have to store this one-time password OTP. The server 2 merely has to store details of which accounts or devices have already used their one-time passwords OTP and/or which accounts or devices may still use their one-time passwords OTP. The data that must be protected is therefore reduced to the cryptographic key K that is used for generating the one-time passwords OTP. The validity of a one-time password OTP can also be limited relative to time. The disclosed method and system may therefore provide a service provider with the possibility of associating one-time passwords OTP with specific conditions, thereby allowing greater flexibility of the service provider and greater security against manipulation.

What is claimed is:

1. A method for providing a one-time password for a user device of a user, said password being intended to register the user device with a server, comprising:
   the server generating the one-time password using a cryptographic operation based on a unique use identifier that uniquely identifies the user device, and transmitting said password to the user device,
   the user device storing the one-time password received from the server and transmitting the one-time password with the use identifier during a registration of the user device with the server, and
   during the registration of the user device with the server, the server verifies the user device with reference to the use identifier that is implicitly contained in the received one-time password.

2. The method of claim 1, wherein the unique use identifier is formed by a user ID of the user or by a user device ID of the user device.

3. The method of claim 1, wherein the server generates the one-time password by calculating a cryptographic function value of the unique use identifier.

4. The method of claim 3, wherein the server calculates the cryptographic function value of the use identifier as a one-time password using a secret cryptographic key.

5. The method of claim 4, wherein the server calculates the cryptographic function value as a one-time password using a predetermined cryptographic function for the unique use identifier using the secret cryptographic key.

6. The method of claim 3, wherein the server calculates the cryptographic function value as a one-time password based on a time stamp or random number.

7. The method of claim 1, wherein the server deletes the one-time password it has generated, after said password has been transmitted to the user device.

8. The method of claim 1, wherein the generated one-time password is sent with the user device to the user for registering the user device of the user with the server.

9. The method of claim 1, wherein the generated one-time password is sent from the server via a data network or using a data medium to a user device sited on the premises of the user, for registering said user device with the server.

10. The method of claim 1, wherein a validity of the one-time password that has been generated by the server expires after a predetermined time duration.

11. A server for providing a one-time password for a user device of a user, said password being useful for registering the user device with the server, the server comprising:
    a processor programmed to:
       generate the one-time password using a cryptographic operation based on a unique use identifier that uniquely identifies the user device, and transmit said password to the user device,
       receive from the user device sends both the one-time password previously sent by the server to the user device and the use identifier,
       verify the user device based on the use identifier that is implicitly contained in the one-time password and the received use identifier, and
       grant access to a service based on the verification.

12. The server of claim 11, wherein the unique use identifier is formed by a user ID of the user or by a user device ID of the user device.

13. The server of claim 11, wherein the server is programmed to generate the one-time password by calculating a cryptographic function value of the unique use identifier.

14. The server of claim 13, wherein the server is programmed to calculates the cryptographic function value of the use identifier as a one-time password using a secret cryptographic key.

15. The server of claim 14, wherein the server is programmed to calculate the cryptographic function value as a one-time password using a predetermined cryptographic function for the unique use identifier using the secret cryptographic key.

16. The server of claim 13, wherein the server is programmed to calculates the cryptographic function value as a one-time password based on a time stamp or random number.

17. The server of claim 11, wherein the server is configured to delete the one-lime password it has generated, after said password has been transmitted to the user device.

18. The server of claim 11, wherein the server is programmed to send the generated one-time password to the user device sited on a premises of the user via a data network or using a data medium.

19. The server of claim 11, wherein a validity of the one-time password that has been generated by the server expires after a predetermined time duration.

20. A method for providing a one-time password for a user device of a user, said password being intended to register the user device with a server, comprising:
    the server generating the one-time password using a cryptographic operation based on a unique use identifier and transmitting said password to the user device,
    the user device storing the one-time password received from the server and transmitting the one-time password with the use identifier during a registration of the user device with the server, and
    during the registration of the user device with the server, the server verifies the user device with reference to the use identifier that is implicitly contained in the received one-time password,
    wherein the server generates the or time password by calculating a cryptographic function value of the unique use identifier either (a) using a secret cryptographic key or (b) based on a time stamp or random number.

* * * * *